Figure 1:
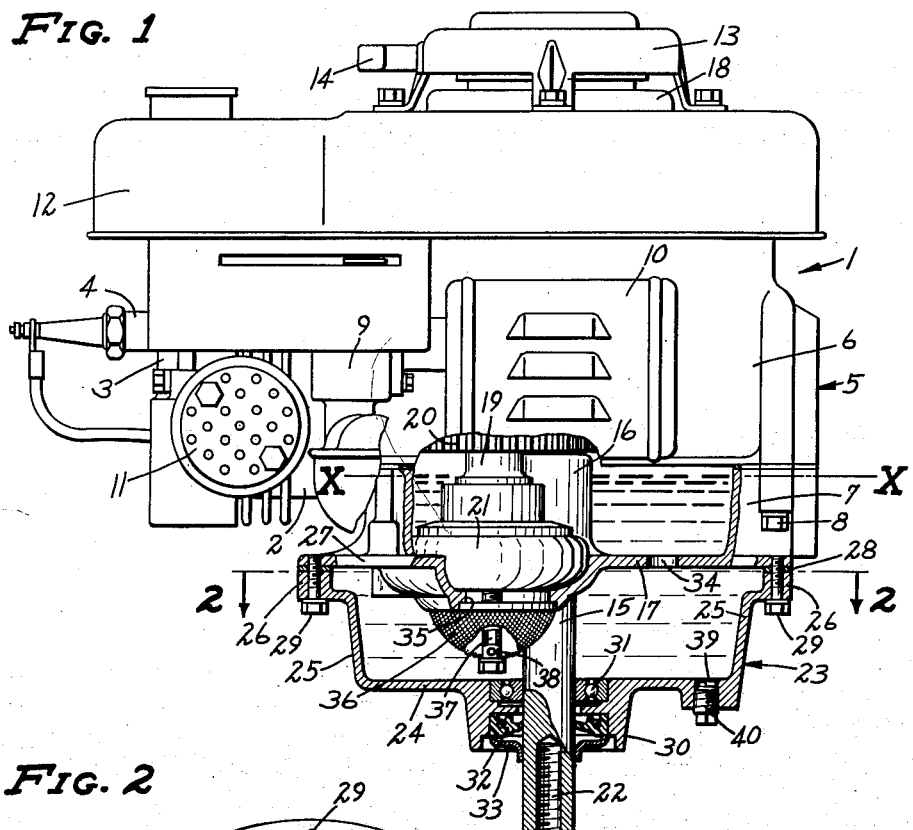

June 5, 1962 W. C. EGLOFF ETAL 3,037,582
COMBINATION OIL RESERVOIR AND BEARING MOUNT
FOR INTERNAL COMBUSTION ENGINES
Filed April 13, 1961

INVENTOR.
WILLIAM C. EGLOFF
CHRISTIAN W. DAHL
BY
Merchant, Merchant + Gould
ATTORNEYS 3,037,582
COMBINATION OIL RESERVOIR AND BEARING MOUNT FOR INTERNAL COMBUSTION ENGINES
William C. Egloff, Anoka, and Christian W. Dahl, Minneapolis, Minn., assignors to Goodall Manufacturing Corporation, Minneapolis, Minn., a corporation of Missouri
Filed Apr. 13, 1961, Ser. No. 102,762
2 Claims. (Cl. 184—6)

Our invention relates generally to improvements in internal combustion engines, and more particularly to such engines which have generally vertically disposed crankshafts and generally used to power small implements such as lawn mowers of the rotary type, that is, mowers utilizing one or more generally horizontally disposed cutting blades rotating on vertical axes.

In present day rotary mower design using four-cycle or four-stroke engines, emphasis has been made on low engine profile in an effort to provide a streamlined appearance. As a result, oil storage capacity of the engine crankcase has been sacrificed to a point wherein the supply of lubricant oil is just adequate to properly lubricate the engine when the level of oil in the crankcase is at the so-called "full" point; and any appreciable consumption of oil by the engine during operation of the mower lowers the level to a dangerously low point, necessitating the keeping of a close check on the oil level. This is particularly important when the mower is used on hilly or banked lawn surfaces. Under such circumstances, if the oil level is not maintained at maximum, and the mower is tilted to a degree where oil in the crankcase is not available to the oil circulating pump, damage to the engine frequently occurs.

An important object of our invention is the provision of an internal combustion engine having a crankcase and a crankshaft journalled therein, and having an oil reservoir mounted on the exterior of the crankcase below the normal oil level in the crankcase and in communication with the oil sump defined by the crankcase, and further having means for conducting oil from the reservoir to the oil circulating pump of the engine, whereby to materially increase the amount of lubricant oil available to the engine.

Another object of our invention is the provision of an oil reservoir which can be quickly and easily applied to present engines of the type herein disclosed, to provide for greater oil storage capacity than heretofore obtained, and with a minimum of change in engine construction.

Still another object of our invention is the provision of an oil reservoir as set forth, having bearing means therein for support of the extended end portion of the engine crankshaft.

Another object of our invention is the provision of an oil reservoir and crankshaft bearing mount for internal combustion engines of the above type, which is relatively simple and inexpensive to produce and install, which is highly efficient in operation, and which is rugged in construction and durable in use.

The above, and still further highly important objects and advantages of our invention will become apparent from the following detailed specification, appended claims and attached drawings.

Figure 2:
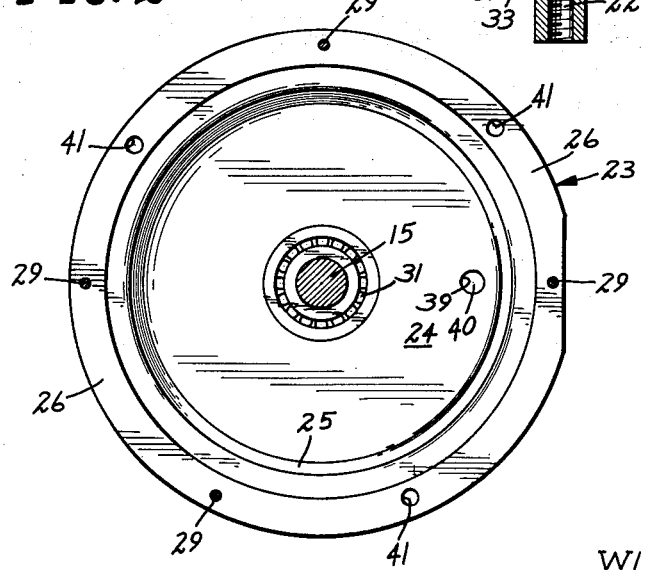

Referring to the drawings, which illustrate the invention, and in which like reference characters indicate like parts through the several views:

FIGURE 1 is a view in side elevation of an internal combustion engine equipped with our oil reservoir and bearing mount, some parts being broken away and some parts being shown in section; and FIG. 2 is a view partly in plan and partly in section, taken on the line 2—2 of FIG. 1, some parts being removed.

Referring with greater detail to the drawings, the numeral 1 indicates, in its entirety, an internal combustion engine of the type generally used for driving the rotors of rotary lawn mowers and the like, the engine comprising a cylinder block 2, having a cylinder head 3 in which is mounted a conventional spark plug 4. The engine 1 further involves a crankcase 5 which includes upper and lower crankcase sections 6 and 7, the lower crankcase section 7 being bolted or otherwise rigidly secured to the upper section 6 by a plurality of bolts or machine screws 8, one of which is shown in FIG. 1. As further shown in FIG. 1, the engine includes the usual carburetor 9 which is equipped with an air filter device 10, and an exhaust muffler 11. A fuel tank 12 is suitably mounted on the top portion of the engine 1, and carries a starting device 13 including a starter handle 14.

The crankshaft of the engine 1, indicated at 15, is disposed for rotation on a vertical axis, the same being journalled in a bearing 16 which projects upwardly from the bottom wall 17 of the lower crankcase section 7. At its upper end portion, the crankshaft 15 may be assumed to be journalled in other bearing means, not shown, having mounted on its extreme upper end the usual fly wheel, a portion of which is shown at 18. The engine 1, being of the four-cycle or four stroke variety, further may be assumed to include the usual piston which reciprocates within the cylinder block 2, connecting rod which operatively couples the piston to the crankshaft 15, intake and exhaust valves for the combustion chamber defined by the cylinder head 3, and means for operating the valve including a cam shaft 19 that is driven from the crankshaft 15 by means of a gear 20 mounted on the cam shaft 19 and operatively coupled to the crankshaft 15.

The lower crankcase section 7 defines an oil sump and is adapted to contain oil lubricant to a level indicated by the line X—X in FIG. 1. A conventional oil pump 21 is disposed at the bottom of the crankcase 5, and is driven by the cam shaft 19. The lower end of the crankshaft 15, which extends considerably below the bottom wall 17 of the crankcase 5, is provided with an axially extended threaded opening 22 for attachment to the end of the crankshaft of a conventional rotary cutting blade, not shown.

The oil circulating pump 21, in and of itself, as well as the other parts of the engine above-described, do not in themselves comprise the instant invention. Hence, for the sake of brevity, further detailed showing and description thereof is omitted, the details thereof being well known to those skilled in the art.

For the purpose of supplying the engine 1 with a more adequate reserve of lubricating oil than can be normally held in the crankcase 5, we provide an open-topped bowl-shaped reservoir 23 comprising a bottom wall 24 and a generally cylindrical side wall 25, the upper edge of which is formed to provide a marginal mounting flange 26. The marginal flange 26 is adapted to have operative sealing engagement with the mounting flange 27 of the motor 1, with the aid of a gasket or the like 28, the reservoir being rigidly secured to the engine 1 by a plurality of machine screws or bolts 29. At its central portion, the bottom wall 24 of the reservoir 23 is formed to provide a boss 30 in which is mounted an anti-friction ball bearing 31 and a conventional annular oil seal 32. As shown in FIG. 1, the lower end portion of the crankshaft 15 is journalled in the bearing 31, and retaining ring 33 is press-fitted on the shaft 15 below the oil seal 32 to hold the seal 32 against accidental removal from the boss 30.

To adapt the engine 1 for use with the reservoir and bearing support 23, it is only necessary that an aperture 34 be drilled or otherwise formed in the bottom wall 17 of the crankcase section 7; and that the bottom wall 17 be further bored below the pump 21, as indicated at 35, to facilitate mounting of a filter screen 36, and to provide access to the pump 21 from the reservoir 23. A hollow bolt 37 is screw threaded into the base of the pump 21, and is utilized to hold the filter screen 36 in place, the lower headed end of the bolt 37 being disposed adjacent the bottom wall 24 of the reservoir 23. Adjacent its head, the bolt 37 is provided with one or more inlet apertures 38 by means of which oil is directed to the pump 21. The bottom wall 24 of the reservoir 23 is provided with a drainage opening 39 that is normally closed by a conventional screw threaded plug 40.

With the use of the reservoir 23, it will be noted that the oil carrying capacity of the engine 1 is substantially doubled, and the engine 1 may be run for greater periods of time than heretofore without the necessity for frequent checks on the oil level. Moreover, the engine 1 may be tilted to greater angles from its normal horizontal position than heretofore, without danger of oil starvation to the running parts.

With reference to FIG. 2, it will be seen that the marginal flange 26 is provided with a plurality of circumferentially spaced openings 41 that are adapted to receive mounting screws or the like, not shown, but by means of which the motor 1 may be mounted on a conventional rotary motor housing, not shown.

Our invention has been thoroughly tested and found to be completely satisfactory for the accomplishment of the objectives set forth; and, while we have shown and described a commercial embodiment of our reservoir and bearing support, it will be understood that the same is capable of modification without departure from the spirit and scope of the invention, as defined in the claims.

What we claim is:

1. In an internal combustion engine having, a crankcase defining a sump for reception of lubricant oil to a predetermined level above the bottom thereof, a crankshaft journalled in said crankcase, and a power driven oil pump disposed within said crankcase adjacent the bottom portion thereof, said crankcase having an aperture in its bottom wall; the combination of an open topped oil reservoir, means mounting said reservoir to the exterior surface of the bottom wall of said crankcase in sealing engagement therewith and in direct communication with said aperture, said reservoir being disposed below the normal level of lubricant within said crankcase, and means defining an oil inlet passage in communication with said reservoir and said oil pump.

2. In an internal combustion engine having, a crankcase defining a sump for reception of lubricant oil to a predetermined level above the bottom thereof, a crankshaft journalled in said crankcase on a normally vertical axis and extending downwardly through the bottom wall of said crankcase, said bottom wall of the crankcase having an aperture therethrough in laterally spaced relation to said crankshaft, and an oil pump within said crankcase adjacent said bottom wall, said bottom wall defining an annular mounting surface; the combination of an upwardly opening bowl-shaped reservoir having a marginal flange operatively sealed to said annular mounting surface, the interior of said reservoir being in direct communication with said aperture, said reservoir having a central opening in its bottom wall through which said crankshaft extends, and means defining an oil inlet passage within said reservoir in communication with said pump and having its inlet end disposed adjacent the bottom wall of said reservoir.

References Cited in the file of this patent

UNITED STATES PATENTS

| | | |
|---|---|---|
| 2,539,619 | Goodall | Jan. 30, 1951 |
| 2,607,332 | Bosma | Aug. 19, 1952 |